United States Patent
Goyal et al.

(10) Patent No.: US 8,150,344 B1
(45) Date of Patent: Apr. 3, 2012

(54) METHOD AND SYSTEM OF PLANNING A WIRELESS TELECOMMUNICATION NETWORK

(75) Inventors: Anoop Goyal, Overland Park, KS (US); E. Michael Shafer, II, Overland Park, KS (US); Shilpa Srinivas Kowdley, Herndon, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 1041 days.

(21) Appl. No.: 12/053,391

(22) Filed: Mar. 21, 2008

Related U.S. Application Data

(63) Continuation-in-part of application No. 12/033,580, filed on Feb. 19, 2008, now abandoned.

(51) Int. Cl.
  *G06F 3/033* (2006.01)
(52) U.S. Cl. ....... 455/130; 455/444; 455/525; 455/41.1; 455/41.2; 455/456.6
(58) Field of Classification Search .................. 455/130, 455/444, 525, 42.1, 42.2, 456.6; 370/338
  See application file for complete search history.

(56) References Cited

U.S. PATENT DOCUMENTS

| | | | |
|---|---|---|---|
| 6,169,895 | B1 | 1/2001 | Buhrmann et al. |
| 6,832,085 | B1 | 12/2004 | McDonagh et al. |
| 7,113,789 | B1 | 9/2006 | Boehmke |
| 2002/0072358 | A1 | 6/2002 | Schneider et al. |
| 2005/0064820 | A1 | 3/2005 | Park et al. |
| 2007/0097938 | A1* | 5/2007 | Nylander et al. ............. 370/338 |
| 2007/0097939 | A1* | 5/2007 | Nylander et al. ............. 370/338 |
| 2008/0188243 | A1* | 8/2008 | Giustina et al. ............ 455/456.6 |
| 2009/0059822 | A1 | 3/2009 | Morrill et al. |
| 2009/0059867 | A1* | 3/2009 | Rajasimman et al. ........ 370/332 |

OTHER PUBLICATIONS

Institute of Electrical and Electronics Engineers, ANSI/IEEE Std 802.11—Information Technology—Telecommunication and Information Exchange Between Systems—Local and Metropolitan Area Networks—Specific Requirements, Institute of Electrical and Electronics Engineers, Chapter 14 (pp. 148-194), Aug. 20, 1999.
Sprint Nextel, Sprint User Guide Sprint Airave, downloaded from the internet on Feb. 19, 2007.

* cited by examiner

*Primary Examiner* — Sanh Phu

(57) ABSTRACT

A method and system are provided for planning a service provider network. At one or more low-cost Internet base stations (LCIBs) operating within a building, one or more wireless signals are detected. The wireless signals are provided by one or more macro base stations. The wireless signals are detected by the LCIB on an LCIB wireless-communication interface. For each detected wireless signal, one or more signal-strength values are determined. The determined signal-strength values are sent from the LCIB via an LCIB packet-communication interface to one or more network entities. The signal-strength values are used to plan the service provider network, by generating one or more network-planning directions and/or one or more network-coverage maps.

20 Claims, 9 Drawing Sheets

METHOD AND SYSTEM OF PLANNING A WIRELESS TELECOMMUNICATION NETWORK

BACKGROUND

Many people use mobile nodes, such as cell phones and personal digital assistants (PDAs), to communicate with wireless-communication networks. These mobile nodes and networks typically communicate over a radio-frequency (RF) air interface according to a wireless protocol such as Code Division Multiple Access (CDMA), perhaps in conformance with one or more industry specifications such as IS-95, IS-856, and IS-2000. Other protocols may be used instead or in addition, such as iDEN, TDMA, AMPS, GSM, GPRS, UMTS, EDGE, WiMAX (e.g., IEEE 802.16), LTE, microwave, satellite, MMDS, Wi-Fi (e.g., IEEE 802.11), and/or others.

Wireless-communication networks typically include a plurality of base transceiver stations (BTSs) or more generally "base stations", each of which provides one or more wireless coverage areas. Each wireless coverage area may be subdivided into areas termed "sectors". A mobile node positioned in a wireless coverage area can communicate over the air interface with the BTS, which typically provides the mobile node access to one or more circuit-switched, packet-switched, or other transport and/or signaling networks. Mobile nodes and BTSs conduct air-interface communication sessions (e.g. voice calls and data sessions) over radio frequencies known as "carrier frequencies" or simply "carriers." Using a sector as an example of a coverage area, a BTS may provide service in a given sector on one or more carriers.

The BTSs for these networks typically are not associated with any subscriber or small group of subscribers in particular; rather, they are placed in publicly-accessible locations and used by a wireless service provider's (WSP's) customers generally. These BTSs collectively blanket geographic areas with coverage; as such, they are referred to generally and herein as "macro BTSs"—and the network they collectively form, or to which they collectively belong, is referred to generally and herein as the "macro network."

From time to time, a WSP may change a macro network's infrastructure to manage call traffic and provide an expected quality of service, and/or for any other reason(s). This process may involve steps such as by moving macro BTSs, changing (i.e. increasing or reducing) the number of sectors in wireless coverage areas, adding new macro BTSs, reallocating carriers among sectors, or otherwise adjusting antennas and other RF equipment. To decide when and where to change the macro network, a WSP may monitor the performance of the macro network, including the signal strength of carriers in various locations. One way to monitor network performance is to send technicians into the field with mobile diagnostic measurement (MDM) tools to collect diagnostic data about network conditions. Collecting data about network conditions by driving or otherwise moving an MDM tool around a given geographic area is known as "drive testing."

To address gaps in macro-network coverage (e.g., poor in-building coverage) and for other reasons, macro-network service providers have recently begun offering consumers devices referred to herein as Low-Cost Internet Base Stations (LCIBs). A typical LCIB will be installed in a building and may be approximately the size of a desktop phone or WiFi access point, and is essentially a low-power, low-capacity, low-cost version of a macro base station. Generally, an LCIB uses a normal power outlet, perhaps with a transformer providing a DC power supply. Typically, LCIBs have fairly comprehensive auto-configuration capabilities, such that they are largely "plug-and-play" to the user. An exemplary LCIB is the Sprint AIRAVE™ manufactured by Samsung Telecommunications America, LLC and sold by the Sprint Nextel Corporation.

LCIBs may also be referred to as femtocells, femto base stations, femto BTSs, picocells (pico base stations, pico BTSs), ubicells, microcells (micro base stations, micro BTSs), and perhaps by other names. The aforementioned terms that end in "cell" may also be generally and herein used interchangeably with the coverage area provided by the respective devices. Note also that "low-cost" is not used herein as a limiting term; that is, devices of any cost may be categorized as LCIBs, though most LCIBs typically will be less expensive on average than most macro-network base stations.

Many WSP subscribers, including private consumers and small businesses, in addition to having wireless service for their mobile node or nodes (which may include data service), also have a high-speed (a.k.a. "broadband") Internet connection for transmitting and receiving data packets through another communication channel. A typical subscriber may have a router connected to both to their high-speed Internet connection (e.g., cable modem) and to one or more devices, including an LCIB.

As such, LCIBs typically have a packet-communication interface that takes the form of a wired (e.g., Ethernet) or wireless (e.g., WiFi) connection with the user's router, providing connectivity to the Internet and/or one or more other packet-data networks via the user's broadband connection. An LCIB may establish a virtual-private-network (VPN) connection over the Internet with an entity (e.g., a VPN terminator) on the wireless-service (macro-network) provider's core network, and thereby be able to communicate securely with the VPN terminator and other entities on that core network and beyond.

A typical LCIB also has a wireless-communication (e.g. CDMA) interface that is compatible with the WSP subscriber's mobile node(s). The LCIB may act as a micro base station, providing coverage on the WSP's network via the user's Internet connection. Usually, an LCIB will provide service on a single RF carrier (or on a single carrier per technology, where multiple technologies (i.e., CDMA, EV-DO) are supported).

An LCIB also may include a Global Positioning System (GPS) receiver for use in receiving and decoding GPS signals. The GPS receiver may be used to determine location and to synchronize operations with other LCIBs and with the macro network based on timing information embedded in GPS signals.

OVERVIEW

As stated, a WSP often relies on drive-test methods to gather signal-strength measurements of a macro network. Drive-test methods can measure signal strengths outside buildings, but cannot, due to privacy concerns and impracticality, among other reasons, measure signal strengths inside numerous buildings, including homes and small offices. However, people often use mobile nodes inside these buildings to communicate via macro networks. Therefore, the WSP may desire to gather macro-network signal-strength measurements inside these numerous buildings. According to embodiments of the invention, an LCIB, operating inside a building, gathers in-building macro-network signal-strength measurements for detected macro-network signals. As more LCIBs are added to the WSP's network, more in-building macro-network signal-strength measurements may be gathered for use by the WSP.

For each detected signal from a macro base station, an LCIB may measure the signal strength and determine a received signal-strength measurement. The LCIB may average multiple signal-strength measurements over time. A network entity, such as a network-planning server, may request that the LCIB send the signal-strength measurements to the network entity. In response to the request, the LCIB may send the signal-strength measurements and perhaps LCIB-location information to the network-planning server. Alternatively, the LCIB may send the signal-strength measurements to the network-planning server autonomously, perhaps at regular time intervals.

The network-planning server may receive the signal-strength measurements. In practice, the network-planning server may gather signal-strength measurements from a plurality of LCIBs associated with the WSP and provide the gathered signal-strength values to one or more network-planning directors, such as a network-map generator and/or a network-optimization director. In one embodiment, a network-map generator may use the gathered signal-strength values to generate network-coverage maps, in order to direct network changes for the WSP. In another embodiment, the gathered signal-strength values drive a network-optimization director, which may comprise one or more network entities that, perhaps among other functions, generate network-planning directions for the macro network. The network-directions may include things such as moving or adding macro BTSs, changing the number of sectors in wireless coverage areas, reallocating carriers among sectors, or adjusting radio-frequency-(RF)-equipment.

These as well as other aspects and advantages will become apparent to those of ordinary skill in the art by reading the following detailed description, with reference where appropriate to the accompanying drawings. Further, it is to be understood that this overview and other descriptions provided herein do not necessarily limit the invention but are instead provided as examples only.

BRIEF DESCRIPTION OF THE DRAWINGS

Various exemplary embodiments are described herein with reference to the following drawings, wherein like numerals denote like entities, in which.

DETAILED DESCRIPTION

1. Exemplary Architecture a. An Exemplary Communication System

Figure 1A:
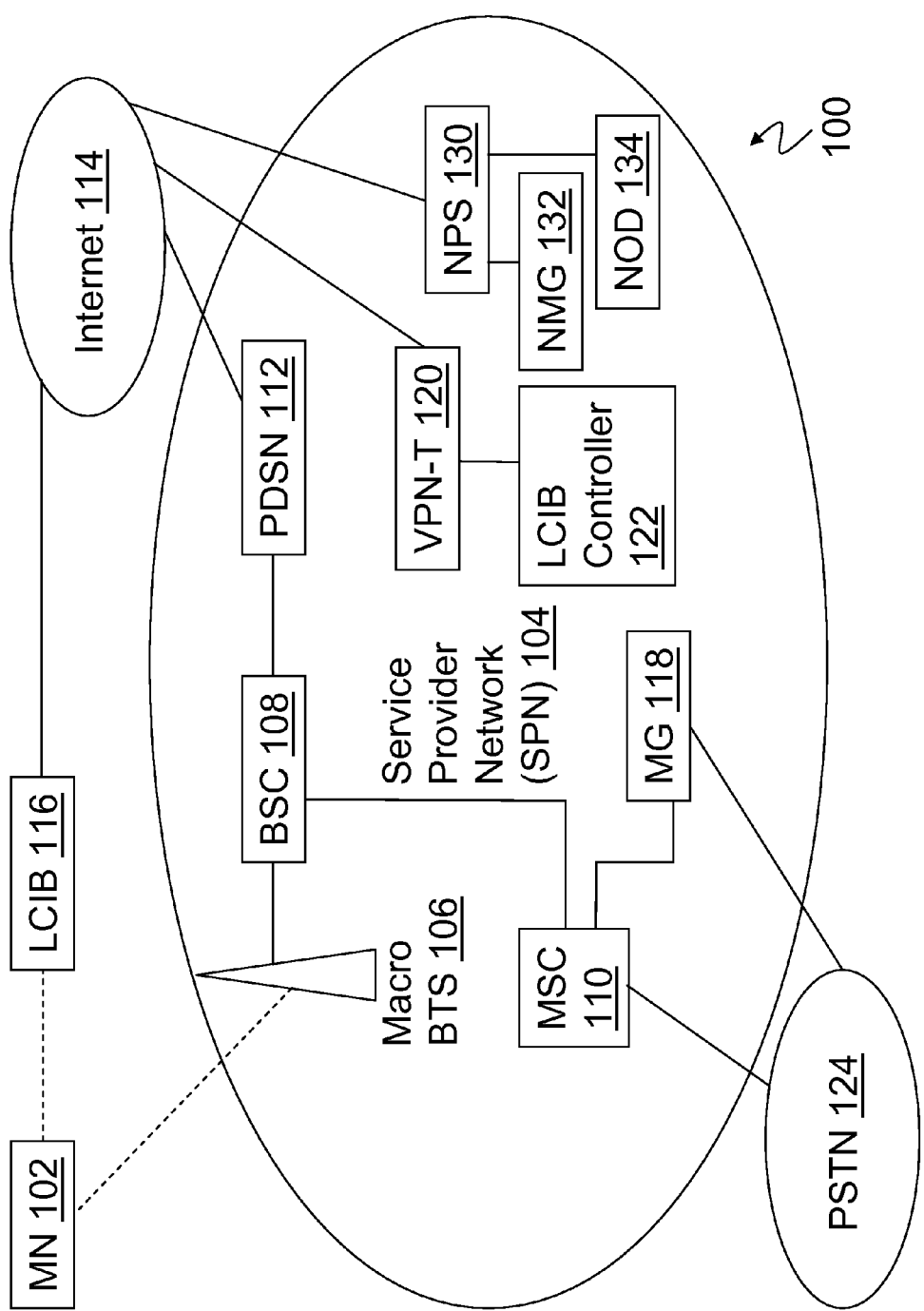
FIG. 1A is a simplified block diagram of a communication system, in accordance with exemplary embodiments.

FIG. 1A is a simplified block diagram of a communication system, in accordance with exemplary embodiments. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1A, a communication system 100 includes a mobile node (MN) 102, a service provider network (SPN) 104, a macro BTS 106, a base station controller (BSC) 108, a mobile switching center (MSC) 110, a packet data serving node (PDSN) 112, the Internet 114, an LCIB 116, a media gateway (MG) 118, a VPN terminator (VPN-T) 120, an LCIB controller 122, a public switched telephone network (PSTN) 124, a network-planning server (NPS) 130, a network-map generator (NMG) 132, and a network-optimization director (NOD) 134. Note that, in FIG. 1A and elsewhere in the Figures, dashed lines are used to indicate wireless communication links.

Note as well that additional network entities may be present, such as additional mobile nodes in communication with macro BTS 106, additional network entities in communication with Internet 114 and/or PSTN 124, etc. Also, there could be one or more devices and/or networks making up at least part of one or more of the communication links. For example, there could be one or more routers, cable modems, and/or other devices or networks on the communication link between the LCIB 116 and the Internet 114. Finally, FIG. 1A depicts networks such as the SPN 104, the Internet 114, and the PSTN 124 as ellipses.

Mobile node 102 may be any mobile device arranged to carry out the mobile-station functions described herein. As such, mobile node 102 may include a user interface, a wireless-communication interface, a location interface such as a GPS-enabled chipset, a processor, and data storage comprising instructions executable by the processor for carrying out those mobile-station functions. The user interface may include buttons, a touch-screen, a microphone, and/or any other elements now known or later developed for receiving inputs, as well as a speaker, one or more displays, and/or any other elements for communicating outputs.

The wireless-communication interface may include an antenna and a chipset suitable for communicating with one or more macro base stations and/or one or more LCIBs over suitable air interfaces. For example, the chipset could be one that is suitable for CDMA communication. The chipset or wireless-communication interface in general may also or instead be able to communicate with other types of networks and devices, such as EV-DO networks, Wi-Fi networks, Bluetooth devices, and/or one or more additional types of networks and devices. The wireless-communication interface may also include the GPS-enabled chipset and/or other location module(s). The GPS-enabled chipset, processor, and data storage may be any suitable components known to those in the art. As examples, mobile node 102 could be or include a cell phone, a PDA, a computer, a laptop computer, a hybrid CDMA/EV-DO device, and/or a multi-mode cellular/Wi-Fi device.

Service-provider network (SPN) 104 may encompass all of the network entities depicted in FIG. 1A as being included within its elliptical shape. In general, there may be more and/or different communication links among network entities within SPN 104, and there may be more and/or different connections between SPN 104 and outside entities. Furthermore, there may be a core packet network (not depicted) making up part of SPN 104, which may enable devices therein to communicate with each other. There may also be one or more other packet-data networks and/or elements, one or more circuit-switched networks and/or elements, one or more signaling networks and/or elements, and/or one or more of any other suitable network(s) and/or element(s).

Macro BTS 106 may be any network entity arranged to carry out the macro-BTS functions described herein. As such, macro BTS 106 may include a communication interface, a processor, and data storage comprising machine-language instructions executable by the processor to carry out those macro-BTS functions. The communication interface may include RF equipment (including one or more antennas), chipsets, and/or other components for providing one or more (e.g., CDMA) coverage areas such as cells and sectors, for communicating with mobile nodes such as mobile node 102 over an air interface. The communication interface may also include one or more wired (e.g. Ethernet) and/or wireless (e.g. WiFi) interfaces for communicating with at least BSC 108.

BSC 108 may be any network entity arranged to carry out the BSC functions described herein. For example, the BSC 108 may comprise the elements of a computing unit 200 shown in FIG. 2. As such, BSC 108 may include a communication interface, a processor, a user interface, and data storage comprising machine-language instructions executable by the processor to carry out those BSC functions. The communication interface may include one or more wired and/or wireless interfaces for communicating with at least macro BTS 106, MSC 110, and PDSN 112. In general, BSC 108 functions to control one or more macro BTSs such as macro BTS 106, and to provide those one or more macro BTSs with connections to devices on service provider network 104.

Note that the combination of macro BTS 106 and BSC 108 may be considered a macro base station. However, macro BTS 106 or BSC 108 could, taken alone, be considered a macro base station as well. Furthermore, a macro base station may be considered to be either or both of those devices, and perhaps make use of one or more functions provided by MSC 110, PDSN 112, and/or any other entity, without departing from the invention. And it should be noted that the macro network and/or the LCIB(s) described herein may operate according to CDMA, EV-DO, iDEN, TDMA, AMPS, GSM, GPRS, UMTS, EDGE, WiMAX (e.g., IEEE 802.16), LTE, microwave, satellite, MMDS, Wi-Fi (e.g., IEEE 802.11), Bluetooth, infrared, and/or any other wireless technology or technologies now known or later developed.

MSC 110 may be any network entity arranged to carry out the MSC functions described herein. For example, the MSC 110 may comprise the elements of the computing unit 200 shown in FIG. 2. Thus, MSC 110 may include a communication interface, a processor, a user interface and data storage comprising machine-language instructions executable by the processor to carry out those MSC functions. The communication interface may include one or more wired and/or wireless interfaces for communicating with at least BSC 108, media gateway 118, and PSTN 124. In general, MSC 110 acts as a switch between PSTN 124 and BSCs such as BSC 108, and may also act as a switch between PSTN 124 and MG 118—in general, facilitating communication between SPN 104 and PSTN 124, which may be the public switched telephone network.

PDSN 112 may be any network entity arranged to carry out the PDSN functions described herein. For example, the PDSN 112 may comprise the elements of the computing unit 200 shown in FIG. 2. As such, PDSN 112 may include a communication interface, a processor, a user interface, and data storage comprising machine-language instructions executable by the processor for carrying out those PDSN functions. The communication interface may include one or more wired and/or wireless interfaces for communicating with at least BSC 108 and Internet 114. In general, PDSN 112 acts as a network access server between Internet 114 and BSCs such as BSC 108, facilitating packet-data communication between mobile nodes and Internet 114, via macro base stations.

Internet 114 may be the well-known global packet-data network generally referred to as the Internet. However, Internet 114 may also be or include one or more other packet-data networks, without departing from the scope and spirit of the present invention. As such, Internet 114 may include one or more wide area networks, one or more local area networks, one or more public networks, one or more private networks, one or more wired networks, one or more wireless networks, and/or one or more networks of any other type. Devices in communication with Internet 114 may exchange data using a packet-switched protocol such as the Internet Protocol (IP), and may be identified by an address such as an IP address.

LCIB 116 may be any computing and communication device arranged to carry out the LCIB functions described herein. As such, LCIB 116 may include one or more communication interfaces, a processor, and data storage comprising instructions executable by the processor for carrying out those LCIB functions.

The communication interfaces may include a wireless-communication interface for communicating with one or more mobile nodes according to a protocol such as CDMA (and/or one or more other technologies), as well as a packet-communication (e.g., Ethernet or WiFi) interface for communicating with a device such as a router and/or a cable modem. LCIB 116 may also have a GPS receiver and/or other location module. LCIB 116 may be operable to receive one or more macro-network signals on the wireless-communication interface, determine a macro-network signal-strength value for each received macro-network signal, and send the one or more signal-strength values to a network entity, such as network-planning server 130, network-map generator 132, and/or network-optimization director 134, using the packet-communication interface. The LCIB 116 is also described in connection with FIG. 3.

Media gateway (MG) 118 may be any network entity arranged to carry out the MG functions described herein. For example, the MG 118 may comprise the elements of the computing unit 200 shown in FIG. 2. As such, MG 118 may include a communication interface, a processor, a user interface, and data storage comprising machine-language instructions executable by the processor for carrying out those media-gateway functions. The communication interface may include both a circuit-switched interface and a packet-switched interface. MG 118 may (a) receive packet-based communications from SPN 104, convert those to circuit-switched communications, and pass them to PSTN 124 (or MSC 110) and (b) receive circuit-switched communications from PSTN 124 (or MSC 110), convert those to packet-based communications, and pass them to SPN 104.

VPN terminator 120 may be any network entity arranged to carry out the VPN-terminator functions described herein. For example, the VPN terminator 120 may comprise the elements of the computing unit 200 shown in FIG. 2. Thus, VPN terminator 120 may include a communication interface, a processor, a user interface, and data storage comprising machine-language instructions executable by the processor for carrying out those VPN-terminator functions. The communication interface may include one or more wired and/or wireless interfaces for communicating with at least LCIB controller 122 and Internet 114. In general, VPN terminator 120 functions to establish secure VPN connections over Internet 114 with LCIBs such as LCIB 116, enabling the LCIBs to securely communicate with devices on SPN 104, such as LCIB controller 122, and perhaps beyond.

LCIB controller 122 may be any network entity arranged to carry out the LCIB-controller functions described herein. For example, the LCIB controller 122 may comprise the elements of the computing unit 200 shown in FIG. 2. Thus, LCIB controller 122 may include a communication interface, a processor, a user interface, and data storage comprising machine-language instructions executable by the processor for carrying out those LCIB-controller functions. The communication interface may include one or more wired and/or wireless interfaces for communicating with at least VPN terminator 120 as well as perhaps one or more other entities on SPN 104 and beyond.

Among other functions, LCIB controller 122 communicates via VPN terminator 120 with LCIBs such as LCIB 116. LCIB controller 122 may receive requests from various LCIBs for configuration data, and those requests may include, among other values, indications of the LCIBs' respective locations. LCIB controller 122 may also be operable to select various operational parameters for LCIBs (e.g., carrier, pseudo-random number (PN) offset, whether to broadcast a pilot beacon, contents of any pilot beacon to be broadcast, transmission-power level), and to transmit those parameters to LCIBs, perhaps along with other configuration data and messaging.

Network-planning server (NPS) 130 may be any device arranged to carry out the network-planning-server functions described herein. For example, the network-planning server 130 may comprise the elements of the computing unit 200 shown in FIG. 2. The network-planning server 130 may receive one or more signal-strength values from a plurality of LCIBs. The network-planning server 130 may receive one or more signal-strength values from other sources as well, such as from a plurality of mobile nodes and/or a plurality of macro BTSs. The network-planning server 130 may store the one or more signal-strength values, and may send the one or more signal-strength values to a network-planning director, such as network-map generator 132 or network-optimization director 134. The network-planning server 130 may send requests to some or all of the plurality of LCIBs to send the signal-strength values to the network-planning server 130. Alternatively, some or all of the plurality of LCIBs may send the signal-strength values periodically or otherwise without being requested by the network-planning server 130. The signal-strength values may be sent over the Internet 114 or via a VPN.

Network-map generator (NMG) 132 may be any device arranged to carry out the network-map-generator functions described herein. For example, the network-map generator 132 may comprise the elements of the computing unit 200 shown in FIG. 2. The network-map generator 132 may receive one or more signal-strength values from the network-planning server 130 and/or from one or more LCIBs. The network-map generator 132 may generate a network-planning map (described in FIG. 7) based, at least in part, on the received signal-strength values.

Network-optimization director (NOD) 134 may be any device arranged to carry out the network-optimization-director functions described herein. For example, the network-optimization director 134 may comprise the elements of the computing unit 200 shown in FIG. 2. The network-optimization director 134 may receive one or more signal-strength values from the network-planning server 130 and/or one or more LCIBs. The network-optimization director 134 may generate one or more network-planning directions (described below) based, at least in part, on the received signal-strength values.

b. An Exemplary Scenario

Figure 1B:
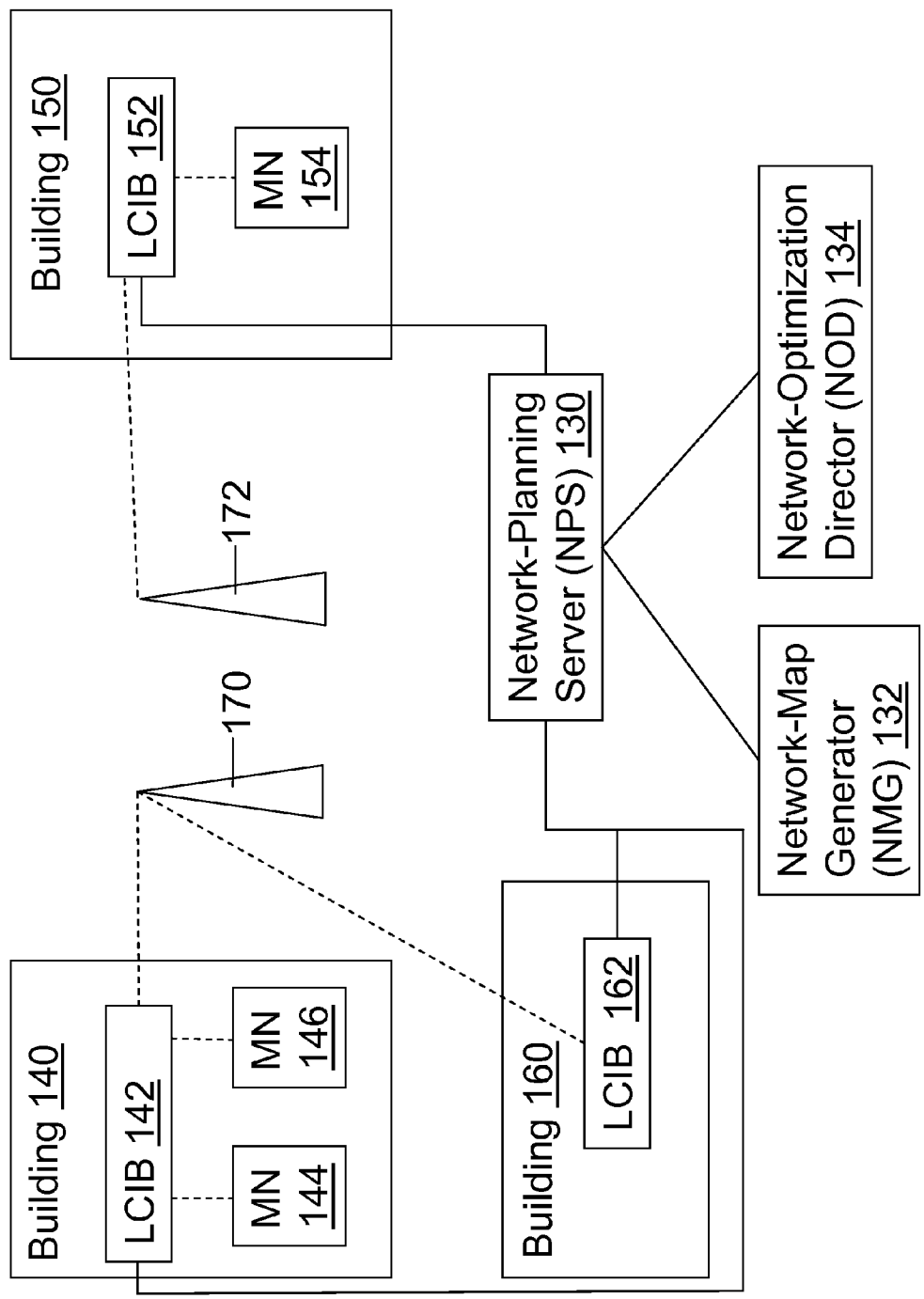
FIG. 1B is a simplified block diagram of an arrangement of communication entities, in accordance with exemplary embodiments.

FIG. 1B depicts an exemplary arrangement of communication elements, in which embodiments of the present invention may be carried out. Note that the arrangement shown in FIG. 1B is by way of example and not by way of limitation: additional and/or different elements could be present in a given scenario, without departing from the invention.

FIG. 1B depicts LCIBs 142, 152, and 162 in buildings 140, 150, and 160, respectively. Each LCIB 142, 152, and 162 may comprise the components shown in FIG. 3, which depicts an exemplary LCIB. FIG. 1B depicts wireless communication links between LCIB 142 and each of two MNs 144 and 146 as well as between LCIB 152 and MN 154. There are also wireless communication links between macro BTS 170 and each of LCIBs 142 and 162, as well as between macro BTS 172 and LCIB 152.

Each of LCIBs 142, 152, and 162 are shown in FIG. 1B as connected to a network-planning server 130. An LCIB may be connected to the network-planning server 130 via the Internet 114, via a VPN through VPN terminator 120, and/or via LCIB controller 122, among many other options. FIG. 1B shows the network-planning server 130 connected to network-map generator 132 and to network-optimization director 134. Again, all of this is by way of example.

Each of the LCIBs 142, 152, and 162 may observe one or more signal-strengths of one or more wireless signals—such as one or more carriers—provided by one or more macro BTSs. Each of the LCIBs 142, 152, and 162 may send the one or more observed signal-strength values to the network-planning server 130, the network-map generator 132, and/or the network-optimization director 134. For example, as shown in FIG. 1B, LCIB 142 may observe one or more signal strengths for the wireless communication link between LCIB 142 and macro BTS 170. The LCIB 142 may send the observed signal-strength values to the network-planning server 130 via its packet-communication interface. An LCIB may send the observed signal-strength values using a format of a signal-strength-value record, such as that shown in FIG. 4.

c. An Exemplary Wireless Coverage Area

Figure 1C:
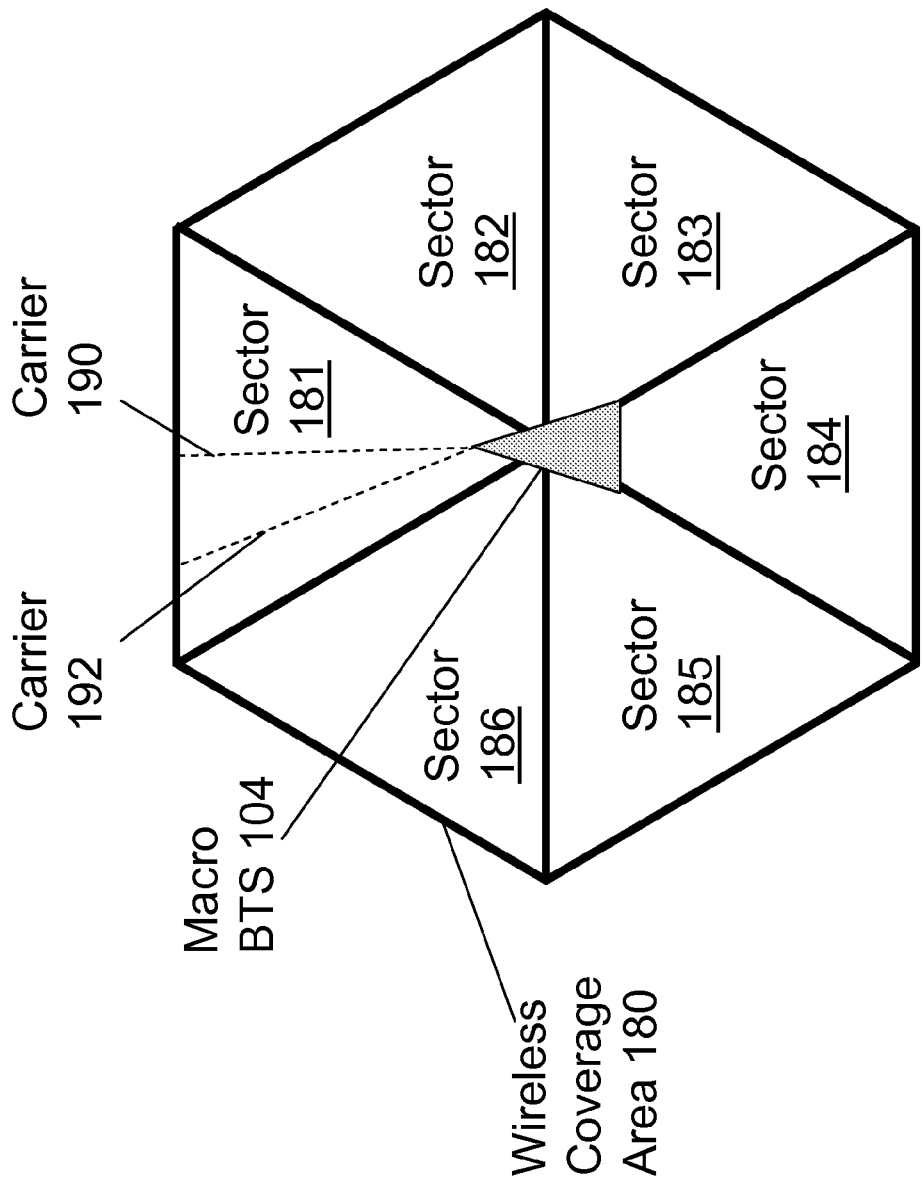
FIG. 1C depicts an example wireless coverage area provided by a macro BTS, in accordance with exemplary embodiments.

FIG. 1C depicts an example wireless coverage area provided by a macro BTS, such as macro BTS 106, in accordance with exemplary embodiments. Macro BTS 106 may provide a wireless coverage area that is divided into one or more sectors. FIG. 1C shows a wireless coverage area 180 of macro BTS 106 that is divided into sectors 181-186. As shown in FIG. 1C, the wireless coverage area 180 is hexagonal and each sector 181-186 is triangular. It is to be understood that a wireless coverage area and/or a sector may take different shapes or forms than that shown in FIG. 1C.

A macro BTS may provide service on one or more carriers in each sector of a wireless coverage area. FIG. 1C shows macro BTS 106 providing carrier 190 in sector 181. A macro BTS may be able to increase capacity for wireless communications within a sector by the addition of carriers to the sector. For example, the addition of carrier 192 to sector 181 may increase the capacity of macro BTS 106 for wireless communications within sector 181. Similarly, the addition of a carrier to all of the sectors of a wireless coverage area of a macro BTS may permit the macro BTS to provide increased capacity for wireless communications throughout the wireless coverage area.

Communications within a sector may be encoded with a respective PN offset that distinguishes the communications in that sector from those in adjacent sectors. A given PN offset may be allocated to only one macro BTS within several nearby coverage areas, in order to minimize interference between macro BTSs, among other reasons. Therefore, the given PN offset may be associated with, and thus identify, a given BTS in a given geographical area.

2. An Exemplary Computing Unit

Figure 2:
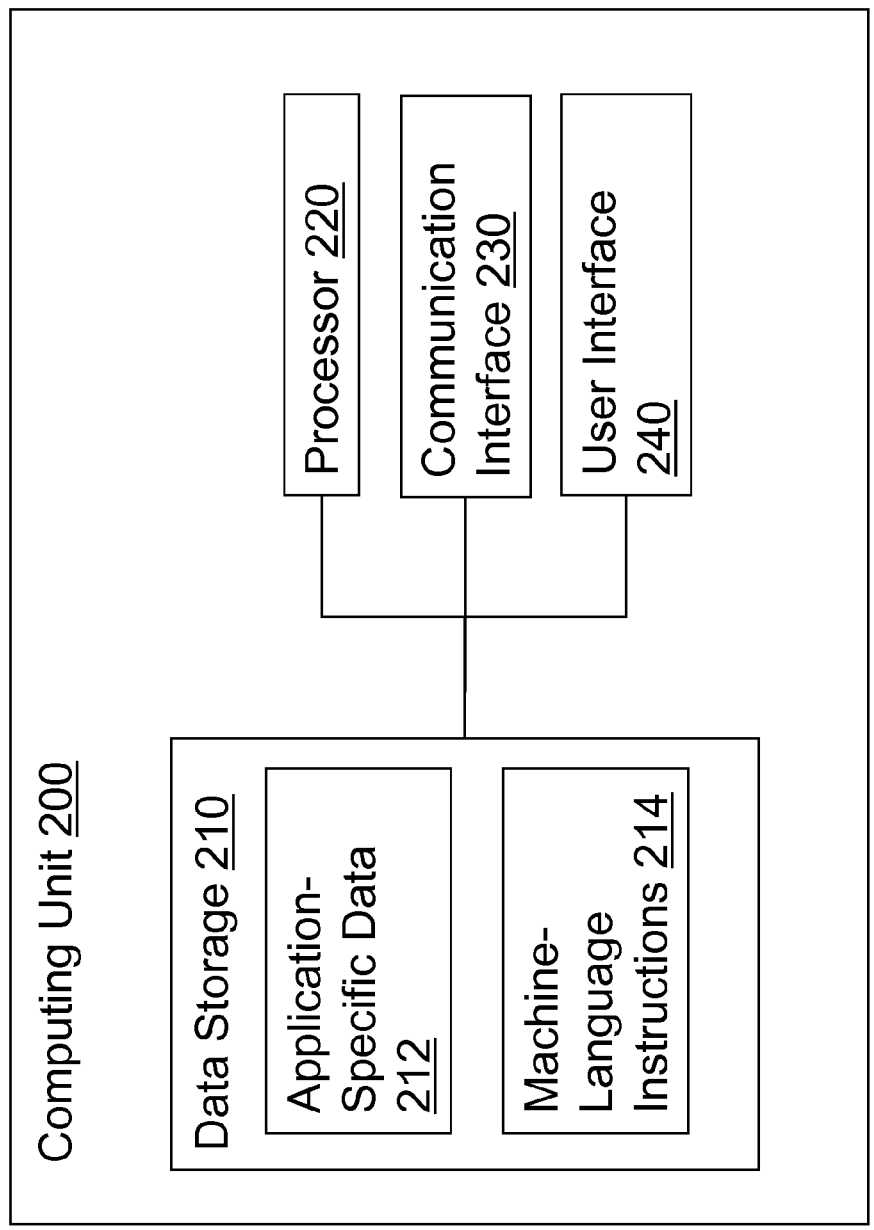
FIG. 2 is a simplified block diagram of an exemplary computing unit, in accordance with exemplary embodiments.

FIG. 2 is a block diagram of a computing unit 200, which comprises data storage 210, a processor 220, a communication interface 230, and a user interface 240. Note that computing unit 200 could have additional and/or different components, and that this structure is provided by way of example. As described herein, BSC 108, MSC 110, PDSN 112, media gateway 116, VPN terminator 120, LCIB controller 122, network-planning server 130, network-map generator 132, and/or network-optimization director 134 may have a structure substantially similar to that of computing unit 200, as may at least part of one or more other entities, including but not limited to macro BTS 106.

The data storage 210 has sufficient storage capacity to store at least: (i) application-specific data 212 and (ii) machine-language instructions (MLIs) 214. The data storage 210 may comprise one or more storage devices now known or hereafter developed operable to store data, perhaps utilizing technologies such as read-only memory (ROM), random access memory (RAM), removable-disk-drive memory, hard-disk memory, magnetic-tape memory, and/or flash memory. The application-specific data 212 may comprise information, such as signal-strength data, that is used by one or more software applications executing on computing device 200.

The processor 220 may include one or more central processing units, computer processors, mobile processors, digital signal processors (DSPs), microprocessors, computer chips, and similar processing units now known or hereafter developed that execute machine-language instructions and process data. The MLIs 214 contained in the data storage 210 include instructions executable by the processor 220 to perform some or all of the herein-described functions of the BSC 108, MSC 110, PSDN 112, MG 118, VPN terminator 120, LCIB controller 122, network-planning server 130, network-map generator 132, and/or the network-optimization director 134.

The communication interface 230 is configured to send and receive data and may include a wired-communication interface and/or a wireless-communication interface. The wired-communication interface, if present, may comprise a wire, cable, fiber-optic link or similar physical connection to a wide area network (WAN), a local area network (LAN), one or more public data networks, such as the Internet, one or more private data networks, or any combination of such networks. The wireless-communication interface, if present, may utilize an air interface, such as an IEEE 802.11 (e.g., Wi-Fi) interface to a WAN, a LAN, one or more public data networks (e.g., the Internet), one or more private data networks, or any combination of public and private data networks.

The user interface 240 may receive user input from a user of the computing device 200 and/or display user output to the user. To receive user input, the user interface 240 may comprise a keyboard, a keypad, a touch screen, one or more buttons, a computer mouse, a track ball, a joystick, and/or other similar devices now known or hereafter developed capable of receiving user input. To display user output, the user interface 240 may comprise a cathode ray tube (CRT), a liquid crystal display (LCD), a light emitting diode (LED), a plasma display, a flat panel display, a display utilizing digital light processing (DLP) technology, a printer, and/or other similar devices now known or hereafter developed capable of displaying user output.

3. An Exemplary LCIB

Figure 3:
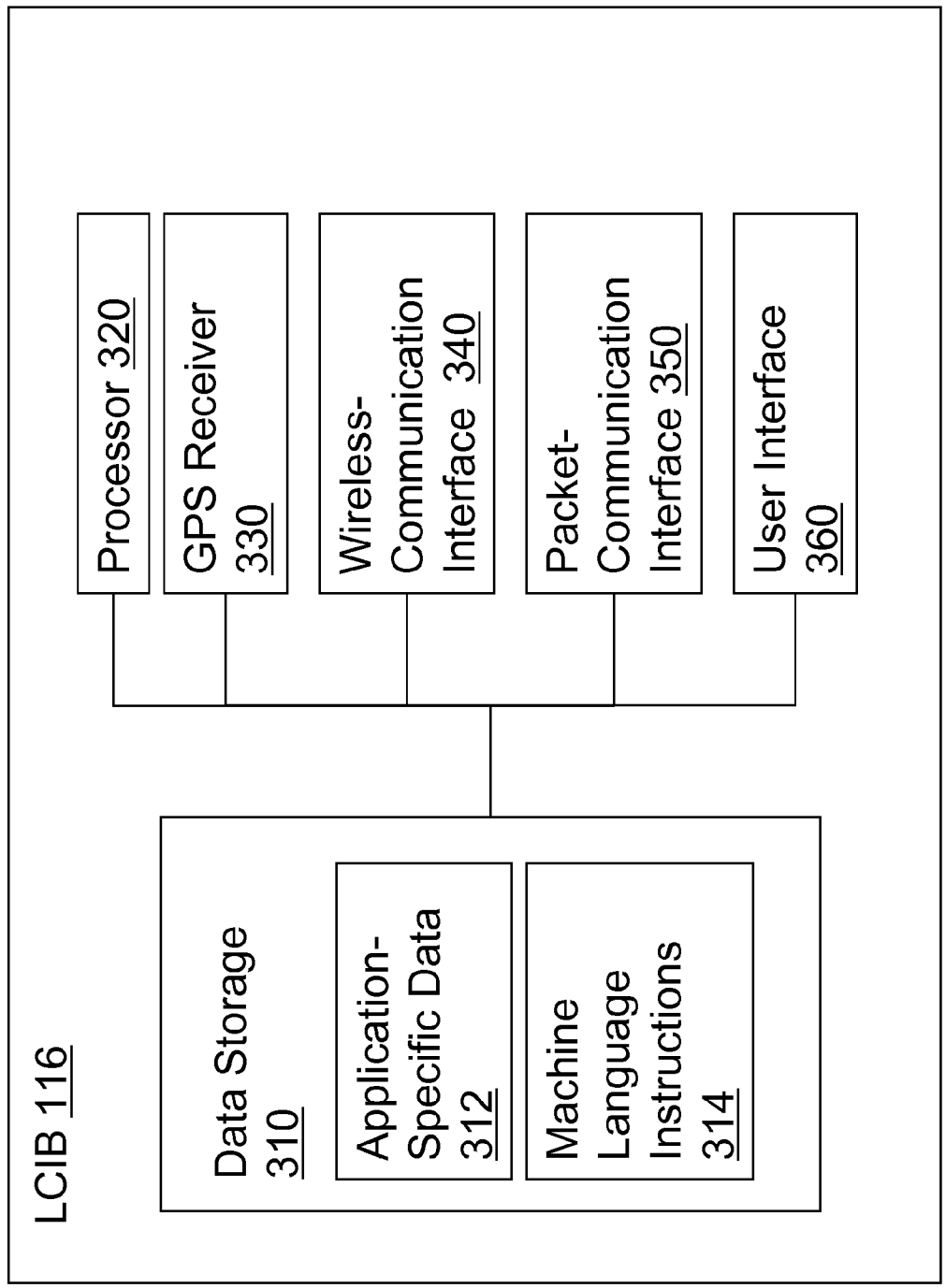
FIG. 3 is a simplified block diagram of an exemplary LCIB, in accordance with exemplary embodiments.

FIG. 3 is a block diagram of an LCIB 116, which comprises data storage 310, a processor 320, a GPS receiver 330, a wireless-communication interface 340, a packet-communication interface 350, and a user interface 360. The data storage 310 has sufficient storage capacity to store at least: (i) application-specific data 312 and (ii) machine-language instructions (MLIs) 314. The data storage 310 may comprise one or more storage devices now known or hereafter developed operable to store data, perhaps utilizing technologies such as read-only memory (ROM), random-access memory (RAM), removable-disk-drive memory, hard-disk memory, magnetic-tape memory, and/or flash memory. The application-specific data 312 may comprise information, such as signal-strength data, that is used or generated by (e.g., from computing an average) one or more software applications executing on LCIB 116. Note that LCIB 116 could have additional and/or different components, and that this structure is provided by way of example.

The processor 320 may include one or more central processing units, computer processors, mobile processors, digital signal processors (DSPs), microprocessors, computer chips, and/or similar processing units now known or hereafter developed that execute machine-language instructions and process data. The MLIs 314 contained in the data storage 310 include instructions executable by the processor 320 to perform some or all of the herein-described functions of an LCIB.

LCIB 116 may also have a GPS receiver 330 and/or other location module. The GPS receiver 330 may be any known or hereafter developed GPS receiver, suitable for receiving and decoding GPS signals for location and timing purposes, perhaps among other purposes. In some embodiments, an LCIB may have a location module in addition to or instead of a GPS receiver.

The wireless-communication interface 340 may include one or more antennas, one or more chipsets, a set of one or more channel elements, and/or one or more other components suitable for providing a wireless coverage area according to a wireless-communication protocol such as CDMA (and/or one or more other technologies). Wireless-communication interface 340 further includes a macro-network receiver, such as a CDMA receiver (e.g. chipset and perhaps antenna) suitable for detecting and receiving one or more transmissions from one or more macro-network base stations.

The packet-communication interface 350 is configured to send data to a server, such as network-planning server 130, and/or a network-planning director, such as network-map generator 132 and/or network-optimization director 134. The packet-communication interface 350 may also be configured to receive one or more requests for signal-strength data. The packet-communication interface 350 may include a wired packet-communication interface and/or a wireless packet-communication interface. The wired packet-communication interface, if present, may comprise a wire, cable, fiber-optic link or similar physical connection to a WAN, a LAN, one or more public data networks, such as the Internet, one or more private data networks, or any combination of such networks. The wireless packet-communication interface, if present, may utilize an air interface to a WAN, a LAN, one or more public data networks (e.g. the Internet), one or more private data networks, or any combination of public and private data networks.

The user interface 360 may receive user input from a user of the LCIB 116 and/or display user output to the user. To receive user input, the user interface 360 may comprise a keyboard, a keypad, a touch screen, one or more buttons, a computer mouse, a track ball, a joystick, and/or other similar devices now known or hereafter developed capable of receiving user input. To display user output, the user interface 360 may comprise a cathode ray tube (CRT), a liquid crystal display (LCD), a light emitting diode (LED), a plasma display, a flat panel display, a display utilizing digital light processing (DLP) technology, and/or other similar devices now known or hereafter developed capable of displaying user output.

4. An Example Format for a Signal-Strength-Value Record

Figure 4:
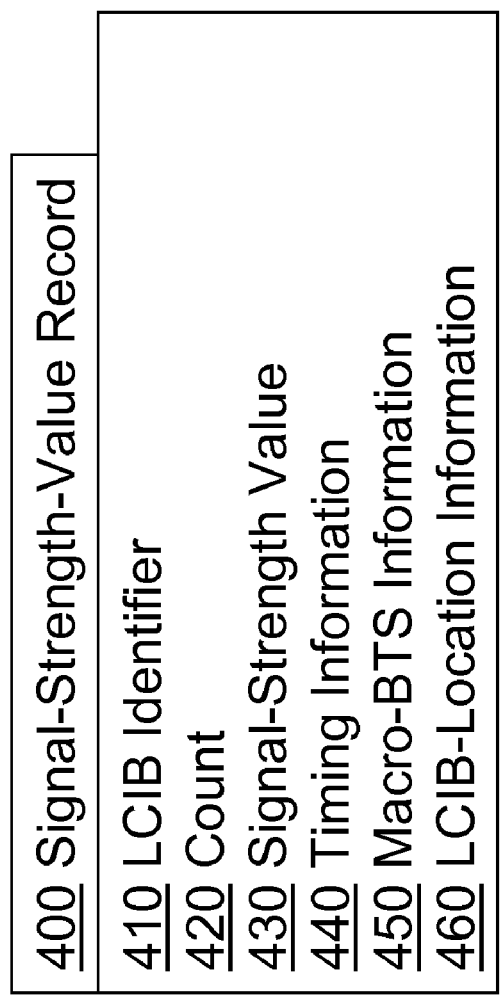
FIG. 4 is an example format of a signal-strength-value record, in accordance with exemplary embodiments.

FIG. 4 shows an example format of a signal-strength-value record 400, comprising an LCIB identifier 410, a count 420, a signal-strength value 430, timing information 440, macro-BTS information 450, and LCIB-location information 460. Other formats for sending signal-strength values are possible as well.

The LCIB identifier 410 may identify an LCIB that observes a strength (or strengths) of one or more signals and may include a serial number, a communications address (e.g. an Internet Protocol (IP) address), an identifier input by a user of LCIB 116 via user interface 360, and/or other similar identifier of the LCIB 116.

The count 420 may indicate a number of signal strengths in the signal-strength-value record 400. For example, if only one signal-strength value is sent in a signal-strength-value record, the count 420 would be equal to one; however, if three signal-strength values were sent in a signal-strength-value record, the count 420 would be three.

For each signal strength sent, a signal-strength value 430, timing information 440, BTS information 450 and/or LCIB-location information 460 may be sent as well. Signal-strength value 430 may be a value of an observation of a signal strength of a wireless signal. Preferably, the signal-strength value 430 reflects an observation made by an LCIB (using an LCIB wireless-communication interface) of a signal strength of a carrier provided by a macro BTS. The signal-strength value 430 may correspond to observation(s) of a signal strength of a wireless signal by an LCIB operating in a building, as in the scenario shown in FIG. 1B.

The signal-strength value 430 may be encoded in the format of a received signal-strength indicator (RSSI) parameter as described in the IEEE 802.11 standard. See Institute of Electrical and Electronics Engineers, *Information Technology—Telecommunication and Information Exchange Between Systems—Local and Metropolitan Area Networks—Specific Requirements*, Aug. 20, 1999, hereby incorporated herein by reference, Chapters 14.2.3.2 and 14.5.5.8.2. The RSSI may be encoded within one byte of data. A particular value of an RSSI may provide a value of relative signal-strength measurement within a range of values from a minimum signal-strength value of zero to a maximum signal-strength value RSSI_Max (e.g. 100 or 255).

The signal-strength value 430 may correspond to a signal-strength observation made at a particular instant in time, or may correspond to an average of a plurality of signal-strength observations. For example, an LCIB may observe the following signal strengths shown in Table 1 over a period of one hour:

TABLE 1

| Time | Signal Strength |
|---|---|
| 10:00 | 50 |
| 10:20 | 48 |
| 10:40 | 50 |
| 11:00 | 56 |

In Table 1, the signal-strength observation made at a time of 10:00 is 50. In the same table, an average of the four signal-strength observations made between 10:00 and 11:00 would be 51.

Timing information 440 may indicate the date and/or time a signal strength was observed. If a signal-strength value 430 corresponds to an average of one or more signal-strength observations observed over time, the timing information 440 may indicate a beginning time and an ending time of the observations. For the example of Table 1, if the timing information 440 corresponds to the average of the four observations made between 10:00 and 11:00, the timing information 440 may indicate a beginning time of 10:00 and an ending time of 11:00. And other possibilities exist as well.

Macro-BTS information 450 may indicate which macro BTS provided the signal observed. For example, the macro-BTS information 450 may be a PN offset value of a carrier signal, or perhaps some other identifier of a macro BTS.

LCIB-location information 460 may indicate where the LCIB was when a signal was observed. A location of an LCIB 116 may be determined by use of a location module, such as GPS receiver 330. As an alternative to sending the LCIB location with each signal-strength value, the LCIB-location information 460 may be sent only once. In this alternative, for each ensuing signal strength, a signal-strength value 430, timing information 440, and BTS information 450 may be sent as well.

5. A Method for Sending Signal-Strength Information from an LCIB

Figure 5:
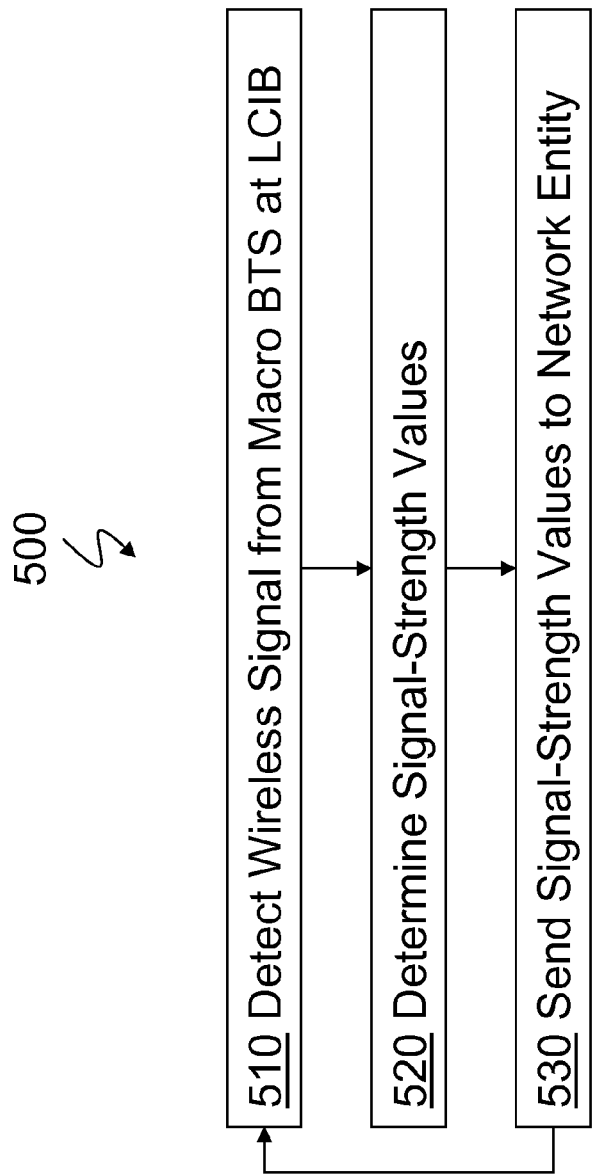
FIG. 5 is a flowchart of a method, in accordance with exemplary embodiments.

FIG. 5 depicts a flowchart of a method, in accordance with an exemplary embodiment. In particular, FIG. 5 depicts a method 500 for sending signal-strength information from an LCIB, such as LCIB 116. Each block of the method 500 is further explained below.

It should be noted that method 500 may be carried out by any combination of LCIB 116, macro BTS 106, VPN terminator 120, LCIB controller 122, network-planning server 130, network-map generator 132, network-optimization director 134, one or more other entities described herein, and/or one or more other entities not described herein, without departing from the scope and spirit of the present invention.

It should be understood that each block in this flowchart and within other flowcharts presented herein may represent a module, segment, or portion of computer program code, which includes one or more executable instructions for implementing specific logical functions or steps in the process. Alternate implementations are included within the scope of the example embodiments in which functions may be executed out of order from that shown or discussed, including substantially concurrently or in reverse order, depending on the functionality involved, as would be understood by those reasonably skilled in the art of the described embodiments.

As shown in FIG. 5, method 500 begins at block 510, when LCIB 116 detects a wireless signal from a macro BTS, such as macro BTS 106 of FIG. 1A. LCIB 116 may use wireless-communication interface 340 to detect the wireless signal from the macro BTS. In some embodiments, macro BTS 106 could be or include a CDMA macro-network base station. As such, the signal could be or include a CDMA signal, which may include one or more overhead channels such as pilot, paging, and sync channels. However, any other wireless technology (GSM, WiMax, etc.) may be used as well, without departing from the invention. Note that the LCIB 116 may detect wireless signals from one or more macro BTSs.

At block 520, LCIB 116 determines one or more signal-strength values for wireless signals provided by one or more macro BTSs. For each wireless signal received, the signal-strength values may be determined by measuring a strength of the received signals and/or may be calculated using a signal-to-noise calculation. A signal-strength value may be determined by averaging one or more collected signal-strength values. The determined signal-strength value may be encoded in the format of an RSSI. The one or more signal-strength values may be collected and stored, such as part of application-specific data 312.

The LCIB 116 may operate in a building, as shown in the scenario of FIG. 1B. An LCIB operating in a building may determine signal-strength values in places, such as inside the building, that are not feasible to reach with other signal-strength measurement methods (e.g. drive-test methods).

At block 530, LCIB 116 sends signal-strength values to a network entity. The network entity may be a server (e.g., network-planning server 130) or a network-planning director (e.g., network-map generator 132 or network-optimization director 134), among other choices. The signal-strength values may be sent by the LCIB: (i) in response to a receiving a request to send signal-strength values via a communication interface, such as wireless-communication interface 340 and/or packet-communication interface 350, (ii) in response to user input, such as from user interface 360, (iii) at fixed intervals in time, (iv) after a fixed number of signal-strength values have been received, or (v) using some other criteria, or some combination thereof.

The signal-strength values may be sent to one or more network entities via packet-communication interface 350. Preferably, the signal-strength values are sent to the one or more network entities over a VPN, the Internet 114, or other packet-data network, so not to add to the amount of data transmitted on a macro network's air interface.

The signal-strength values may be encrypted before being sent using an encryption algorithm, such as the RSA algorithm, the RC4 algorithm, Data Encryption Standard (DES), DES3, Blowfish, and/or International Data Encryption Algorithm (IDEA), among others. If the signal-strength values are encrypted before being sent, then the signal-strength values may be decrypted when received using a decryption algorithm, such as the encryption algorithms listed above.

One or more signal-strength values may be sent by an LCIB to one or more other network entities using the format of a signal-strength-value record 400, or using some other format. For example, if LCIB 116 is to send four signal-strength values to network-planning server 130, LCIB 116 may send each of the four signal-strength values shown in Table 1 separately or may send multiple signal-strength values at the same time.

The LCIB 116 also may send LCIB-location information to one or more network entities. The LCIB may use a location module, such as GPS receiver 330, to determine the LCIB-location information which may be sent apart from or together with signal-strength information.

For example, assume an LCIB has an LCIB identifier of "LCIB1," receives a carrier from a BTS "BTS1" that is identified by a PN offset of "432", and is in a location of "Location1." The LCIB may send all four signal-strength values indicated in Table 1 at one time using a signal-strength-value record such as shown in Table 2 below:

TABLE 2

| | |
|---|---|
| LCIB Identifier | LCIB 1 |
| Count | 4 |
| Signal-Strength Value | 50 |
| Timing Information | 10:00 |
| BTS Information | 432 (i.e. PN offset for BTS1) |
| Location Information | Location 1 |
| Signal-Strength Value | 48 |
| Timing Information | 10:20 |
| BTS Information | 432 |
| Location Information | Location 1 |
| Signal-Strength Value | 50 |
| Timing Information | 10:40 |
| BTS Information | 432 |
| Location Information | Location 1 |
| Signal-Strength Value | 56 |
| Timing Information | 11:00 |
| BTS Information | 432 |
| Location Information | Location 1 |

The combination of location information and signal-strength information may be particularly useful in planning wireless telecommunication networks that serve large buildings, such as government buildings, shopping malls, office complexes, or warehouses. If a plurality of LCIBs are operating in a (large) building, signal-strength observations for carrier(s) provided by a particular BTS may be taken from each of the plurality of LCIBs. The observed signal strengths may indicate that the signal strength(s) of the carrier(s) provided by the particular BTS are not uniform throughout the building (i.e. there are "dead spots" of coverage in the building). In that case, the macro network may be adjusted, such as by increasing a gain level of a carrier or repositioning RF equipment, among other options, to provide uniform, nearly uniform, or at least adequate signal strengths of carrier(s) throughout the building.

After completing block 530, the method 500 returns to block 510.

6. A Method for Generating Network-Planning Directions

Figure 6:
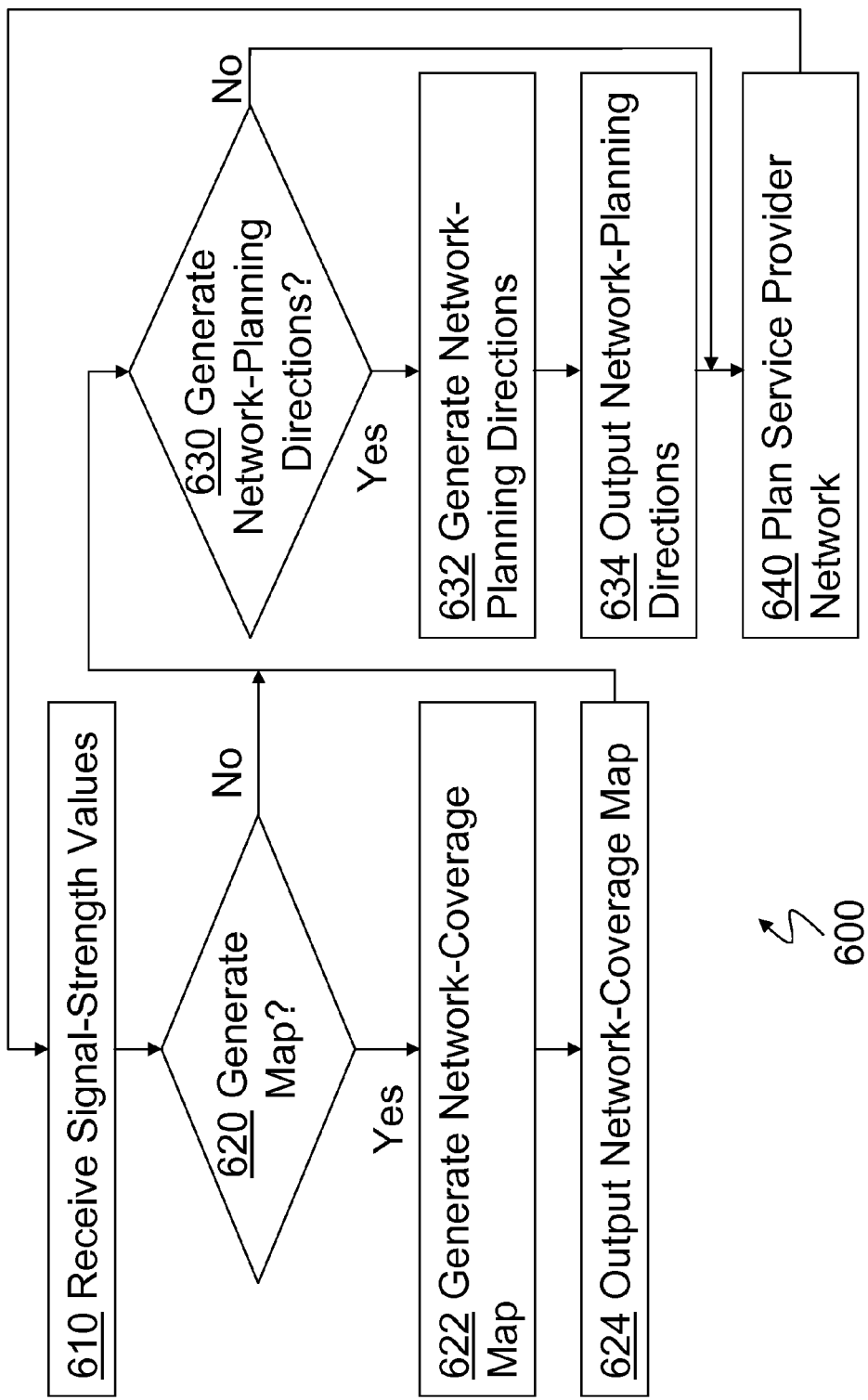
FIG. 6 is a flowchart of a method, in accordance with exemplary embodiments.

FIG. 6 is a flowchart of an exemplary method, in accordance with an embodiment of the invention. In particular, FIG. 6 depicts a method 600 for generating planning directions, such as a network-planning map and/or network-planning directions, based on signal-strength values collected by one or more LCIBs. It should be noted that method 600 may be carried out by any combination of the network-planning server 130, network-map generator 132, network-optimization director 134, one or more other entities described herein, and/or one or more other entities not described herein, without departing from the scope and spirit of the present invention.

The exemplary method 600 begins at block 610, wherein signal-strength values are received. The signal-strength values may be received at a network-planning server 130, network-map generator 132, and/or network-optimization director 134. The signal-strength values may be received and/or gathered from a plurality of LCIBs, each of which may be the same as (or similar to) LCIB 116. At a network-map generator 132 or a network-optimization director 134, the signal-strength values may be received from a network-planning server 130. The received signal-strength values may be in the format of a signal-strength-value record 400.

One or more network entities, such as network-planning server 130, network-map generator 132, and/or network-optimization director 134, may send requests to one or more LCIBs in the plurality of LCIBs to send signal-strength values. The one or more network entities may send the request to the one or more LCIBs using a communication interface, such as communication interface 230. Responsive to receiving the request, the LCIBs may send signal-strength values. One or more LCIBs in the plurality of LCIBs may also or instead send signal-strength values to the network-planning server 130, network-map generator 132, and/or network-optimization director 134 without receiving a request, as described above in block 530 of method 500.

The received signal-strength values may be stored by the one or more network entities. For example, the network-planning server 130 may store the received signal-strength values as application-specific data 212. The stored signal-strength values may be stored using the format of a signal-strength-value record 400 or in some other format.

The received signal-strength values may be sent from a first network entity, such as network-planning server 130, to a second network entity, such as network-map generator 132 and/or network-optimization director 134. The signal-strength values may be sent by the first network entity: (i) in response to a receiving a request to send signal-strength values to the second network entity via a communication interface, such as communication interface 230, (ii) in response to user input from user interface 240, (iii) at fixed intervals in time, (iv) after a fixed number of signal-strength values have been received, or (v) using some other criteria, or some combination thereof.

The received signal-strength values may be sent by the first network entity via a communication interface, such as communication interface 230, to the second network entity. For example, if the signal-strength values were received at the network-planning server 130, the network-planning server 130 may send the signal-strength values via communication interface 230 to the network-map generator 132. The received signal-strength values may be sent using the format of a signal-strength-value record 400 or in some other format.

At block 620, a determination is made as to whether to generate one or more network-coverage maps. A network-coverage map may be generated: (i) in response to a receiving a request to generate the network-coverage map, (ii) in response to user input, (iii) at fixed intervals in time, (iv) after a fixed number of signal-strength values have been received, or (v) using some other criteria, or some combination thereof. If network-coverage maps are to be generated, the method 600 proceeds to block 622. If no network-coverage maps are to be generated, the method 600 proceeds to block 630.

At block 622, a network-coverage map is generated based at least in part on the received signal-strength values from the LCIBs, perhaps in the form of a report. A network-coverage map may be generated to indicate signal strengths in a plurality of wireless coverage areas. As an example, the network-coverage map for a given wireless coverage area provided by a given BTS may be generated by some or all of the following steps:

1. Receiving a plurality of signal-strength values. The plurality of signal-strength values may comprise signal-strength values sent from a plurality of LCIBs, signal-strength values observed by a plurality of mobile nodes and/or other sources, such as observations made by mobile diagnostic measurement tools.

2. Filtering the plurality of signal-strength values to include only those observed in the given wireless coverage area. In one embodiment, the signal-strength values may be filtered based on BTS information 450, in order to identify the signal strengths that correspond to a given BTS.

3. Sub-dividing the network-coverage map into a plurality of displayable portions. For example, suppose a network-coverage map for displaying a given wireless coverage area consists of a Gx×Gy grid of pixels. In the Gx×Gy grid of pixels, one or more pixels may be a displayable portion of the network-coverage map.

4. Determining a coordinate transformation between locations in the wireless coverage area and displayable portions of the network-coverage map. The coordinate transformation may be used to determine a location in the network-coverage map that corresponds to a location in the wireless coverage area.

As a non-limiting example, suppose that a given wireless coverage area corresponds to a rectangular area with real-world coordinates (e.g., latitude and longitude) of (x1, y1) at a first corner of the wireless coverage area and real-world coordinates of (x2,y2) at a second corner of the wireless coverage area, such that x2>x1 and y2>y1. Further suppose an example network-coverage map consists of a Gx×Gy grid of pixels and that one pixel is a displayable portion of the network-coverage map. Let (x,y) be a location expressed in real-world coordinates in the wireless coverage area, where x1<=x<=x2 and y1<=y<=y2. Then, an example coordinate transformation that determines a location (map_x, map_y) in the example network-coverage map corresponding to the location (x, y) in the wireless coverage area may be:

$$\text{map\_}x=(x-x1)/(x2-x1)*Gx; \text{ and}$$

$$\text{map\_}y=(y-y1)/(y2-y1)*Gy$$

If a displayable area is a pixel in the network-coverage map, then the location (map_x, map_y) may be the coordinates of a displayable portion within the network-coverage map. Other coordinate transformations, such as, but not limited to, use of more or fewer dimensions, use of non-rectangular coordinate systems, and use of non-linear coordinate transformations, may be used.

5. Using the determined coordinate transformation, transforming the coordinates of each location of a signal-strength value where a signal was observed to the coordinates of a displayable portion within the network-coverage map. If a signal-strength value is in the format of a signal-strength-value record, the location of a signal-strength value may be determined by use of the LCIB-location information 460.

6. For a given displayable portion, combining the signal-strength values for the given displayable portion. The signal-strength values may be combined by adding the signal-strength values, multiplying the signal-strength values, averaging the signal-strength values, determining a median signal-strength value, or by use of other arithmetic and/or statistical operations or algorithms capable of combining the signal-strength values.

7. Determining a displayed value for the displayable portion based on the combined signal-strength value for a given displayable portion. The combined-signal strength value may be used to determine a displayed value for the displayable portion of the network-coverage map, by linear or non-linear scaling of the combined signal-strength value or otherwise determining displayed values based on combined signal-strength values.

Figure 7:
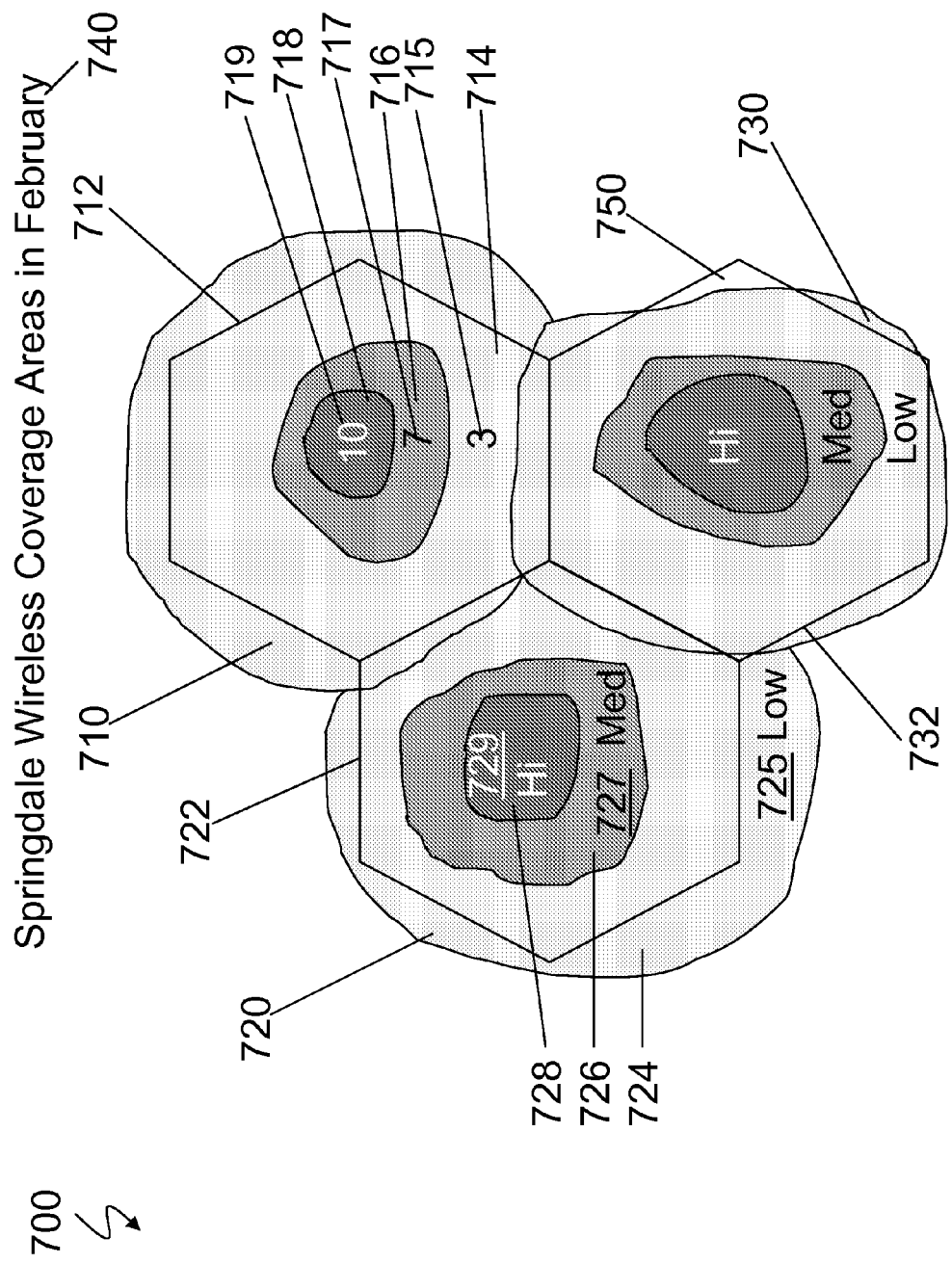
FIG. 7 is an example of a network-coverage map, in accordance with exemplary embodiments.

FIG. 7 shows an example network-coverage map 700 for three wireless coverage areas 710, 720, and 730. Each respective wireless coverage area may be generated by a macro BTS, such as macro BTS 106. A wireless coverage area may have an "expected coverage area" that shows a planned area of coverage of wireless signals in the wireless coverage area and/or an "actual coverage area" that shows an observed area of coverage of wireless signals in the wireless coverage area. An expected coverage area of a wireless coverage area may be shown on the network-coverage map. FIG. 7 shows the expected coverage areas 712, 722, and 732 of each respective wireless coverage area as a hexagonal pattern.

An actual coverage area of a wireless coverage area may be shown on the network-coverage map 700. The network-coverage map may indicate relative signal strengths within an actual coverage area numerically, graphically, and/or textually, among other options. The relative signal strengths may be indicated in a grey-scaled and/or color-coded fashion, wherein different shades of gray and/or colors indicate relative signal strengths within the actual coverage area. FIG. 7 indicates the relative signal strengths for wireless coverage area 720 using different shades of gray, so that a low-strength actual coverage area 724 is shown in a lighter shade of gray than a medium-strength actual coverage area 726, and the medium-strength actual coverage area 726 is shown in a lighter shade of gray than a high-strength actual coverage area 728.

The relative signal strengths in an actual coverage area of a wireless coverage area may also or instead be indicated textually. FIG. 7 shows the relative signal strengths of wireless coverage area 720 indicated textually, so that the low-strength actual coverage area 724 is indicated using low-strength textual indicator 725 (e.g., "Low"), the medium-strength actual coverage area 726 is indicated using medium-strength textual indicator 727 (e.g., "Med"), and the high-strength actual coverage area 728 is indicated using high-strength textual indicator 729 (e.g., "Hi").

The relative signal strengths in an actual coverage area of a wireless coverage area may also or instead be shown numerically. FIG. 7 shows the relative signal strengths of wireless coverage area indicated numerically, so that a low-strength coverage area 714 is indicated using low-strength numerical indicator 715 ("3"), a medium-strength coverage area 716 is indicated using medium-strength numerical indicator 717 ("7"), and a high-strength coverage area 718 is indicated using a high-strength numerical indicator 719 ("10").

The network-coverage map may have a title. FIG. 7 shows a title 740 for the network coverage area indicating a location of "Springdale" and a timespan of "February" for the network-coverage map 700.

A wireless coverage map may indicate one or more network gaps. A network gap is an area within a wireless coverage area without a signal from any macro BTS. FIG. 7 shows a network gap 750 as an area within the expected coverage area 732 of wireless coverage area 730 without shading. Changes may be made to a macro network to address a network gap and/or a relatively large low-strength coverage area. The changes to the macro network may be according to network-planning directions, which are discussed below.

Returning to FIG. 6, at block 624 of method 600, the network-coverage map is output. The network-coverage map may be output to an electronic medium, such as a computer file, e-mail, web page, or fax transmission and/or printed to paper or another non-electronic medium, such as transparency film.

At block 630, a determination is made as to whether to generate one or more network-planning directions. Network-planning directions may be generated: (i) in response to a receiving a request to generate network-planning directions, (ii) in response to user input, (iii) at fixed intervals in time, (iv) after a fixed number of signal-strength values have been received, or (v) using some other criteria, or some combination thereof. If network-planning directions are to be generated, the method 600 proceeds to block 632. If no network-planning directions are to be generated, the method 600 proceeds to block 640.

At block 632, one or more network-planning directions are generated. The term "network-planning direction" is used herein to describe an action item to adjust equipment within a macro network. Examples of action items to adjust equipment are: adding macro BTSs, removing macro BTSs, moving macro BTSs, changing the number of sectors in wireless coverage areas, reallocating carriers among sectors, and/or adjusting radio-frequency (RF) equipment. And many other action items are possible.

A network-planning direction may be issued if the network-optimization director determines that equipment serving one or more sectors of one or more actual coverage areas requires adjustment. The network-optimization director may determine this based on signal-strength values in one or more sectors of an actual coverage area. The signal-strength values in one or more sectors may be determined based, at least in part, on observations of signal-strength from a plurality of LCIBs operating in the one or more sectors.

For example, suppose a sector has a network gap in a given area, as determined by the signal-strength values in that sector. Then, the network-optimization director may determine that equipment in one or more sectors requires adjustment to increase signal strength in the given area to close (i.e., provide signal coverage to) the network gap.

As another example, suppose a geographical region, which may or may not be completely within a sector, has a relatively-large area of relatively-low signal strength. This may be identified by: (i) identifying a signal-strength threshold value, perhaps algorithmically and/or by user input, (ii) identifying an area threshold value, perhaps algorithmically and/or by user input, (iii) identifying a contiguous area where signal-strength values are less than or equal to the signal-strength threshold value, (iii) determining the size of the contiguous area, and (v) determining whether the size of the contiguous area is greater than or equal to the area threshold value.

Responsive to the determination that an area within the geographical region is a relatively-large area of relatively-low signal strength, the network-optimization director may determine that equipment in one or more sectors requires adjustment to increase signal strength to part or all of the relatively-large area of relatively low signal strength.

A network-planning direction to add a macro BTS to a geographical region may add wireless coverage areas to the given geographical region, which may improve coverage in the given geographical region. Further, the addition of wireless coverage areas may add capacity to process wireless communications within the given geographical region. Conversely, a network planning direction to remove a macro BTS from a given geographical area may decrease coverage and/or capacity to process wireless communications within the given geographical region. A network-planning direction to move a macro BTS from a source geographical region to a destination geographical region may reduce coverage and/or capacity in the source geographical region, while adding coverage and/or capacity to the destination geographical region.

A network-planning direction to change (i.e., increase or decrease) the number of sectors in a wireless coverage area may alter the size and/or shape of the wireless coverage area, and/or may add or remove capacity to process wireless communications. A network-planning direction to reallocate a carrier from a source sector to a destination sector may reduce capacity to the source sector and increase capacity in the destination sector.

Adjustments to RF equipment may include changing the placement of antennas and/or antenna arrays and/or altering gain levels and other parameters of the RF equipment. The adjustments to RF equipment may change signal strengths within a wireless coverage area generally, and within a sector, specifically. For example, increasing a gain level of RF equipment providing a carrier within a sector may increase the signal strength of the carrier within the sector.

At block 634, the network-planning directions are output. The network-planning directions may be output to an electronic medium, such as a computer file, e-mail, web page, or fax transmission and/or printed to paper or another non-electronic medium, such as transparency film. The network-planning directions may take the form of a list of instructions, electronic or printed work orders, or the like. The network-planning directions may include the sector(s), wireless coverage area(s), and macro BTS(s) affected by the network-planning directions.

At block 640, the macro network may be planned based at least in part on the network-coverage map(s) and/or the network-planning directions generated by method 600. The network-planning directions generated for a plurality of wireless coverage areas may be prioritized or otherwise arranged among the plurality of wireless coverage areas. The prioritization may be based on a variety of factors, including but not limited to: observation of the network-coverage map(s) by network planners, technical concerns (i.e., gaps in wireless coverage areas), actual and predicted communication patterns within wireless coverage areas, budgetary concerns and limitations, governmental regulations, and strategic decisions (e.g., entry into or exit from a market). Based on prioritization of the network-planning directions, an macro-network-wide plan may then be formed for the actual movement, addition, removal, or adjustment of macro BTSs, carriers and/or RF equipment within the macro network. Upon completion of block 640, the method 600 returns to block 610.

Note that executing the network-planning directions and/or the macro-network-wide plan is separate and distinct from both the steps of generating the network-planning directions and planning the macro network. That is, the network-planning directions and/or the macro-network-wide plan may be executed by the actual movement, addition, removal, or adjustment of macro BTSs, carriers and/or RF equipment, perhaps among other steps.

7. Conclusion

Various exemplary embodiments have been described above. Those skilled in the art will understand, however, that changes and modifications may be made to those examples without departing from the scope of the claims.

What is claimed is:

1. A method, comprising:
   a low-cost Internet base station (LCIB) detecting a wireless signal from a macro base station in a macro network on an LCIB wireless-communication interface, wherein the LCIB is operating in a building;
   the LCIB determining at least one signal-strength value for the detected wireless signal; and
   the LCIB sending the at least one signal-strength value to at least one network entity via an LCIB packet-communication interface, wherein the at least one network entity comprises at least one network-planning director;
   generating, using the network-planning director, at least one network-planning direction for the macro network based, at least in part, on the at least one signal-strength value, wherein the at least one network-planning direction comprises a direction to reallocate at least one carrier from a first sector to a second sector; and
   planning the macro network in accordance with the at least one generated network-planning direction.

2. The method of claim 1, wherein the at least one network entity comprises at least one network-planning server.

3. The method of claim 2, wherein sending the at least one signal-strength value to the at least one network entity further comprises:
   sending the at least one signal-strength value to the at least one network-planning server in response to receiving a request from the at least one network-planning server.

4. The method of claim 2, further comprising the at least one network-planning server storing the at least one signal-strength value.

5. The method of claim 4, further comprising the at least one network-planning server sending at least one signal-strength value to at least one network-planning director.

6. The method of claim 1, wherein the LCIB further comprises a Global Positioning System (GPS) receiver, the method further comprising the LCIB using the GPS receiver to determine a location of the LCIB.

7. The method of claim 6, further comprising the LCIB sending the location of the LCIB to the at least one network-planning server.

8. The method of claim 1,
   wherein the at least one network-planning direction further comprises a network-planning direction to add at least one sector to at least one wireless coverage area.

9. The method of claim 1, wherein the at least one network-planning director comprises at least one of a network-map generator and a network-optimization director.

10. The method of claim 1, wherein the at least one network-planning direction further comprises at least one network-coverage map.

11. The method of claim 10, wherein the at least one network-coverage map comprises a graphical indication of the at least one signal-strength value.

12. The method of claim 1, wherein determining the at least one signal-strength value comprises averaging a plurality of signal-strength values.

13. A system, comprising:
   (a) at least one low-cost Internet base station (LCIB), operating in a building, each LCIB comprising:
      an LCIB wireless-communication interface, an LCIB packet-communication interface, LCIB data storage, an LCIB processor, and machine-language instructions stored in the LCIB data storage and executable by the LCIB processor to perform functions including:

detecting one or more signals from at least one macro base station via the LCIB wireless-communication interface, determining at least one signal-strength value for each of the one or more detected signals, and sending the at least one signal-strength value via the LCIB packet-communication interface to at least one network entity;

(b) at least one network-planning server (NPS), each NPS comprising an NPS communication interface, NPS data storage, an NPS processor, and machine-language instructions stored in the NPS data storage and executable by the NPS processor to perform functions including:

receiving the at least one signal-strength value from the at least one LCIB, storing the received at least one signal-strength value in the NPS data storage, and sending the at least one stored signal-strength value to at least one network entity; and (c) at least one network-optimization director (NOD), each NOD comprising:

a NOD communication interface, NOD data storage, a NOD processor, and machine-language instructions stored in the NOD data storage and executable by the NOD processor to perform functions including:

receiving the at least one signal-strength value via the NOD communication interface, generating at least one network-planning direction based, at least in part, on the at least one received signal-strength value, and outputting the at least one network-planning direction.

14. The system of claim 13, wherein the at least one network-planning direction comprises a network-coverage map.

15. The system of claim 13, wherein the at least one NOD receiving the at least one signal-strength value over the NOD communication interface comprises receiving the at least one signal-strength value over the NOD communication interface from the at least one NPS.

16. The system of claim 15, wherein the machine-language instructions stored in the at least one NPS further comprise instructions to receive a request from a network entity for at least one signal-strength value, and to send the at least one requested signal-strength value to the network entity.

17. The system of claim 16, wherein the machine-language instructions stored in the at least one NOD further comprise instructions to send a request for at least one signal-strength value to the at least one NPS, and to receive the requested at least one signal-strength value from the at least one NPS.

18. The system of claim 17, wherein the machine-language instructions stored in the NPS further comprise instructions to send a request for least one signal-strength value to the at least one LCIB, and the machine-language instructions stored in the LCIB further comprise instructions to send at least the one signal-strength value to the at least one NPS in response to receiving to the request.

19. The system of claim 13, wherein the machine-language instructions stored in the LCIB further comprise instructions to send base transceiver station (BTS) information for each of the one or more detected signals to the at least one network entity.

20. The system of claim 13, wherein the at least one network-planning direction comprises a network-planning direction to add at least one sector to at least one wireless coverage area.

* * * * *